AUTOMATIC FREQUENCY CONTROL SYSTEM

Filed July 1, 1959 3 Sheets-Sheet 1

Inventors
Johannes Backwinkel
Albrecht Altmann
By Michael S. Striker
Attorney

Inventors
Johannes Backwinkel
Albrecht Altmann
BY Michael S. Striker
Attorney

AUTOMATIC FREQUENCY CONTROL SYSTEM

Filed July 1, 1959 3 Sheets-Sheet 3

Jnventors

Johannes Backwinkel

Albrecht Altmann

BY Michael S. Striker

Attorney

United States Patent Office 3,049,587
Patented Aug. 14, 1962

3,049,587

AUTOMATIC FREQUENCY CONTROL SYSTEM

Johannes Backwinkel and Albrecht Altmann, Hildesheim, Niedersachsen, Germany, assignors to Blaupunkt-Werke G.m.b.H., Hildesheim, Niedersachsen, Germany Filed July 1, 1959, Ser. No. 824,252
Claims priority, application Germany July 12, 1958
4 Claims. (Cl. 178—5.8)

This invention relates to automatic frequency control systems, and its principal object is the provision of such a system that is characterized by a greatly extended lock-in range.

Automatic frequency control systems have found many applications, the best known of which are in automatic tuning of oscillators in radio and television transmitters and receivers. In the broadest aspect, an automatic frequency control system contemplates a reference frequency standard, a frequency generator producing a frequency intended to have a predetermined relation to the reference frequency but apt to deviate from such predetermined relation, a discriminator that senses the frequency deviation and provides a control or error signal proportional to the deviation, and a voltage dependent reactance that is included in the frequency determining network of the generator. The reactance varies in response to the error voltage and accordingly alters the frequency of the generator in a sense so as to approach the reference frequency and thus causes the error signal to approach zero. This method of operation is often referred to as "locking in" of the frequency generator.

In receiving systems, including many better quality A.M., F.M. and television receivers, provided with automatic frequency control (A.F.C.) the reference is provided by the carrier frequency of the transmitter, and the frequency generator function is performed by the local oscillator. It is intended that the local oscillator operate at a predetermined frequency above or below that of the transmitter carrier frequency, but in practice the local oscillator is apt to be slightly detuned. The two signals are combined in a mixer stage which produces a difference frequency, known as intermediate frequency (I.F.). The I.F. signal is amplified, and sometimes limited, and then applied to the discriminator which develops the error voltage. The latter is fed to a variable reactance, sometimes in the form of a "reactance tube modulator" that drives the local oscillator frequency to lock-in.

The aforegoing description is directly applicable to A.M. and F.M. receivers. In the latter, the discriminator additionally develops the audio signal. In television receivers, the aforegoing also holds true, subject however, to a second frequency conversion from picture I.F. to sound I.F. In the case of television receivers, it is further necessary to distinguish between the so called "split sound" and "inter-carrier" systems. In the former, as in the case of F.M. receivers, the error voltage may be derived directly from the sound discriminator. On the other hand in the case of inter-carrier systems, the sound I.F. is fixed at the difference of the transmitter sound and picture carriers, and is therefore incapable of developing an error signal. An automatic frequency control system for an inter-carrier television receiver accordingly requires a separate discriminator operating in the picture I.F. range.

The present invention will be described with reference to a television receiving system, but it is not limited thereto. The invention is equally applicable to systems wherein the frequency generator feeds the discriminator directly, that is without frequency conversion, and for that matter without actual generation of a reference frequency.

The discriminator, provided that it is stable in its characteristic, may constitute a reference frequency standard of its own.

It should further be recognized that automatic frequency control systems have found applications of such diversity as to confer a separate status in the art, that is independent of transmitting and receiving systems. For example, in United States Patent 2,542,372, granted to Taylor et al. on February 20, 1951, an automatic frequency control system is employed in an apparatus for the measurement of moisture in textile web to lock in the operating frequency of an oscillator on the instant tuning frequency of a tuned amplifier energized by the oscillator. The tuning frequency of the amplifier is variable in accordance with moisture content in the web. It is appreciated, that in this example the reference frequency standard, namely the tuning frequency of the amplifier is not constant, but continuously variable.

The present invention is applicable, to our knowledge, to all automatic frequency control systems that operate in accordance with the aforementioned principles. Accordingly it is intended that the terms "reference frequency standard," "oscillator," "frequency generator," "variable" or "frequency dependent reactance," and "discriminator" be construed in the broadest sense. In particular, it is intended that for purposes of definition of a discriminator, a symmetrical characteristic about the null-point (corresponding to the desired frequency) is unnecessary. As will be seen hereinafter, the discriminator characteristic of a television receiving system is usually asymmetrically.

In automatic frequency control systems heretofore known, the discriminator characteristic commonly has a maximum and a minimum, with the null point located therebetween. It is preferably, but not necessarily linear over substantially the entire range between maximum and minimum. This range is defined as the "hold-in" range for the oscillator in the sense that once the oscillator has locked in and thereafter departs from the desired frequency, it will revert to the desired frequency provided it has not departed beyond the hold-in range. On the other hand, the lock-in range is even less than the hold-in range, as will be seen from the theoretical considerations evolved below.

We propose to extend the lock-in range to approximately the full hold-in range by provision of a second discriminator which has a characteristic curve that so complements the characteristic of the first discriminator as to approach leveling off of the resultant composite discriminator characteristic outside of the hold-in range. In accordance with another aspect of the invention, especially in the case of television receivers, the second discriminator provides a complementary characteristic which renders the composite discriminator characteristic approximately symmetrical thereby considerably extending the lock-in range. This has the beneficial results not only of providing automatic fine tuning over a range not previously achieved, but also minimizing adjacent channel interference and avoiding the possibility of false lock-in on an adjacent channel. A particular advantage of this aspect of the invention resides in the fact that no special provision of a second discriminator need be made. In many high quality television receivers there is provided a phase discriminator which forms part of a control system that automatically locks in the phase of the horizontal drive pulses on that of the separated horizontal synchronization pulses. Fortuitously the phase discriminator provides the proper characteristic necessary for complementing that of the discriminator for automatic frequency control purposes.

Other advantages and novel features of the invention will be apparent from the following, more detailed specification of which the appended claims form a part, when considered together with the accompanying drawings, in which:

Figure 1:
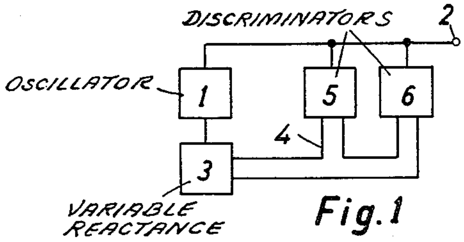
FIG. 1 is a simplified block diagram of apparatus according to one embodiment of the invention.

Referring to FIG. 1, a variable frequency oscillator 1, which is mechanically or manually tunable, delivers its output to a terminal 2, and also to a principal discriminator 5 and an auxiliary discriminator 6. The discriminators provide respective D.C. error voltages which are summed, and as summed applied via line 4 to a variable reactance 3 which is included in the frequency determining network of oscillator 1. Responsive to application of the summed error voltages reactance 3 is altered, thereby altering the oscillator frequency to approach a desired value and ultimately causing the individual and summed error voltages to approach zero. The error voltages may be summed by any conventional means, which for purposes of the description of FIG. 1 may be assumed to be included in discriminator 5. One specific form of summing means will be described with reference to FIG. 9 hereinafter.

Figure 2:
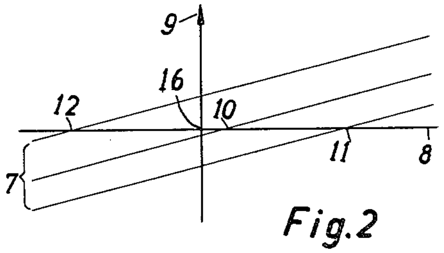
FIGS. 2, 3 and 4 are graphs illustrating the operation of the apparatus of FIG. 1.
Figures 3, 4:
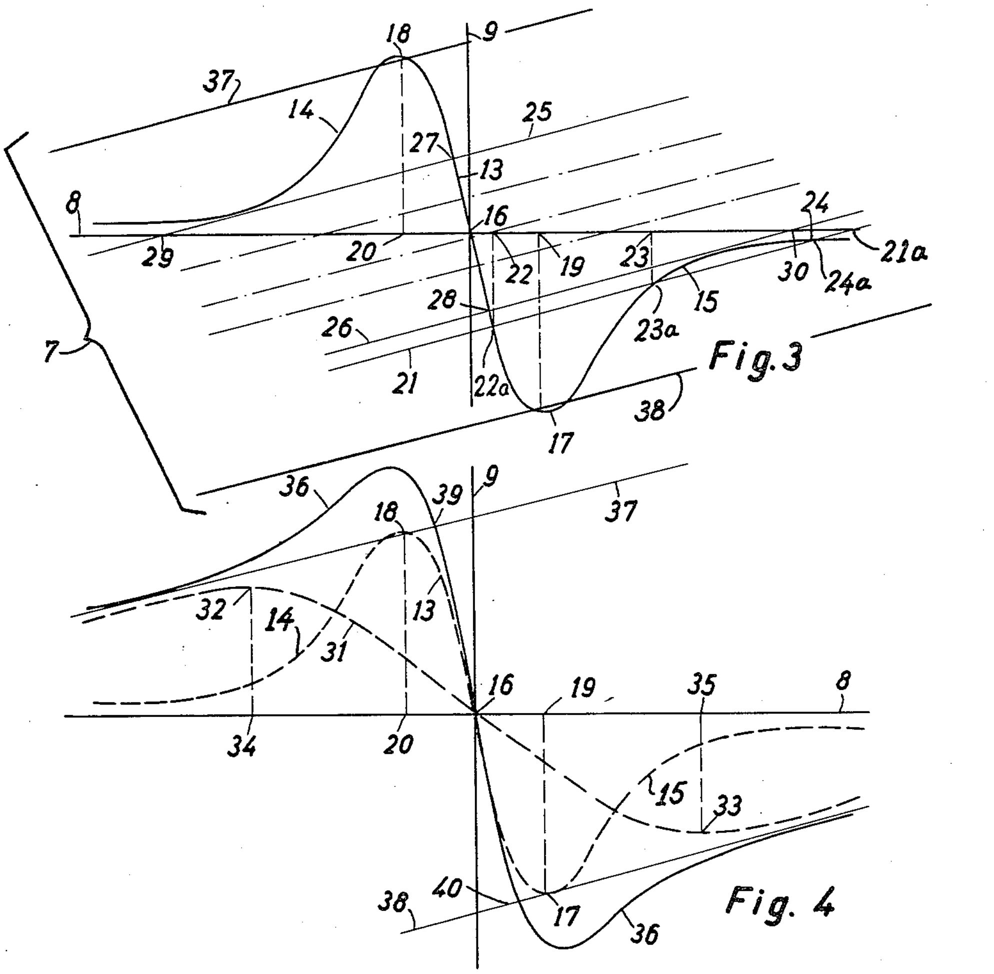

The operation of the A.F.C. system of FIG. 1 will be understood with reference to FIGS. 2, 3, and 4.

Referring next to FIG. 2, the operating frequency characteristics of a variable reactance modulated oscillator are illustrated by a family of straight lines designated collectively as 7. The axes of abscissae and ordinates are designated by 8 and 9, and represent respectively oscillator operating frequency, and control voltage applied to the reactance. It should be understood that the intersection of axes 8 and 9, that is, the origin 16, represent zero volts, but not zero frequency. All frequencies are presumed to be positive. However, the frequency scale can be considered as reflecting deviation in frequency from the origin or center operating frequency 16, and to that extent frequency deviations are indicated as of both positive and negative sense.

The points of intersection of the line 7 and axis 8 are designated as by 12, 10 and 11 respectively, and represent what will be termed free operating frequencies of the oscillator, which are the oscillator operating frequencies that would result upon removal of the error signal. Three such frequencies are indicated, and in fact many more are possible, depending upon the manual or mechanical setting of the oscillator tuning control. The effect of application of the error signal is represented by the full straight lines.

Referring to FIG. 3, there is shown, in part, a replica of FIG. 2 as indicated by like reference numerals. A discriminator characteristic having ascending curved portion 14, positive peak on maximum 18, straight line portion 13 passing through the origin 16, negative peak or minimum 17, and curved portion 15 symmetrical to portion 14 with respect to origin 16, is typical of conventional systems. The frequencies corresponding to the peaks are 20 and 19 respectively.

The oscillator characteristics 7 include a plurality of parallel straight lines as previously, of which lines 21, 25, 26, 37 and 38 are of particular interest as immediately described. The operating frequency for the oscillator for any given manual tuning therof, is determined by the particular one of the lines 7 corresponding to such tuning, and of the discriminator characteristic. In particular line 21 which corresponds to a free operating frequency 21*a*, intersects the discriminator characteristic at three points designated at 22*a*, 23*a*, and 24*a*, giving rise to three possible operating frequencies 22, 23 and 24. Operating point 23*a* represents an unstable condition, as the slightest disturbance will force operation ultimately to point 24*a* which is outside of the desired linear range. This is so, because the A.F.C. system will inherently seek that of several possible operating points which produces an error voltage closest to zero. Stated somewhat differently, the system "resists" increase in error voltage and favors decrease in error voltage.

This is not to say that operating point 22*a* and corresponding operating frequency 22 are not realizable. Whether operating point 22*a* or 24*a* are obtained in response to manual tuning to the free operating frequency 21*a* depends on whether this free operating frequency is approached from the left or from the right. For example, assume that the free operating frequency had been initially at 30 on line 26, giving rise to operating point 28. If thereafter the free operating frequency is set at 21*a*, the operating point will shift to 22*a*, but will not shift further to 23*a* or 24*a*, for in passing from operating point 22*a* to operating point 23*a* it is necessary that the magnitude of error voltage first increase towards the peak 17, and the system inherently resists doing so, and consequently holds it at operating point 22*a*. If on the other hand free operating frequency 21*a* is approached from the right, the system will settle at operating point 24*a* and will not proceed to points 23*a* or 22*a* for the very same reason of resistance to increase in magnitude of the error voltage necessary.

The straight lines 37 and 38 pass through the peaks 18 and 17 respectively and define the limits of the hold-in range. That is when either of the peaks has been once established as operating point and thereafter one proceeds inwardly therefrom towards origin 16, the system will be held in. On the other hand the lock-in range is limited by the straight lines 25 and 26 corresponding to free operating frequencies 29 and 30 respectively, which lines are just barely not tangent to the discriminator characteristic, and therefore give rise to but single respective operating points 27 and 28.

The description of the FIGS. 2 and 3 has been applicable to conventional A.F.C. system that would result were the auxiliary discriminator 6 of FIG. 1 omitted. The effect of introduction of discriminator 6 is to extend the lock-in range substantially to the original hold-in range, as explained with reference to FIG. 4. Here the characteristics of FIG. 2 are reproduced in pertinent part as indicated by correspondence of reference numerals. The characteristic of discriminator 6 is represented by the curve 31, which also passes through the origin 16, is symmetrical with respect to the origin, and has positive and negative peaks 32 and 33 which correspond to frequencies 34 and 35 and are located respectively to the left and to the right of the peak frequencies 20 and 19 of the principal discriminator curve. Necessarily the peaks 32 and 33 are of lesser magnitude than are peaks 18 and 17. The summation of the two discriminator curves is represented by composite characteristic 36 which has peaks corresponding substantially to the frequencies 20 and 19 as before. It approaches asymptotically the previously limiting lines 37 and 38 to the outside of the peaks and intersects the same at operating points 39 and 40 respectively. Points 39 and 40 define the limits of the new lock-in range. It is readily seen that the lock-in range and particularly its linear portion has been greatly extended. The discriminator 6 may be of conventional construction, similar to that of the discriminator 5, except that it is properly tuned and loaded resistively to produce the displaced peaks 32 and 33.

Figure 5:
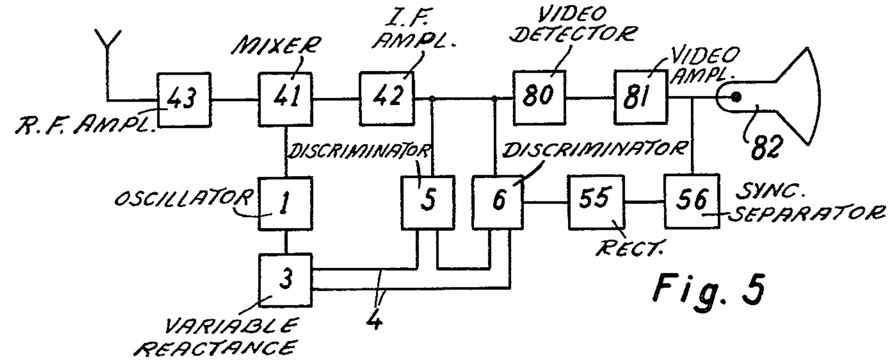
FIG. 5 is a simplified block diagram of a television receiver embodying the invention as illustrated in FIG. 1 and also a modification thereof.

FIG. 5 illustrates application of the previously described concepts to an intercarrier television receiving system. Previously described parts are designated by like, respective reference numerals. An R.F. amplifier stage 43 receives transmitted energy from the antenna and delivers an amplified signal to a mixer stage 41, which receives a mixing signal from local oscillator 1. The resultant picture I.F. signal is amplified in unit 42, which feeds both the principal discriminator 5 and auxiliary discriminator 6, both centered about the picture I.F. The discriminator output signals are applied over lines 4 to the variable reactance 3 which causes local oscillator 1 to lock in.

The I.F. amplifier further feeds a video detector 80, which in turn excites a video amplifier 81, that supplies the kinescope 82 and the sync. separator 56. The sound channel (not shown) may be supplied from video detector or video amplifier. In accordance with another aspect of the invention, the discriminator 6 is augmented or replaced by another discriminator in the form of the sync. separator 56, which delivers separated horizontal synchronization pulses to a rectifier 55, whose output is combined with that of discriminators 5 and 6, or solely 5 as the case may be, for application to the variable reactance.

Figure 6:
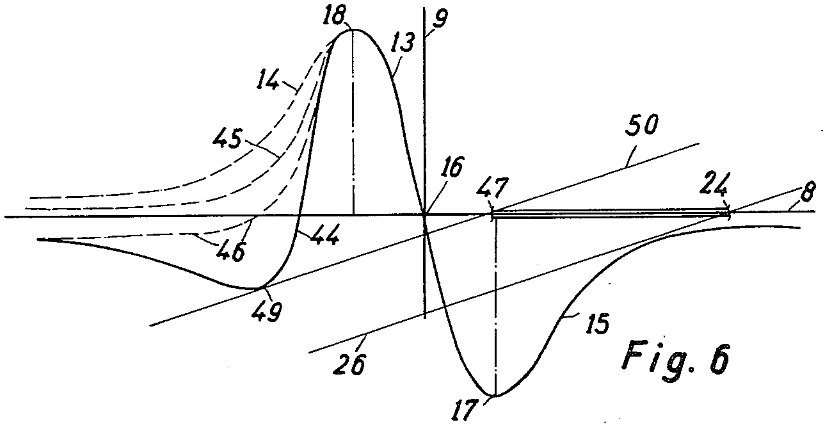
FIGS. 6 and 7 are graphs illustrating the operation of the apparatus according to FIGS. 5, 8 and 9.
Figure 7:
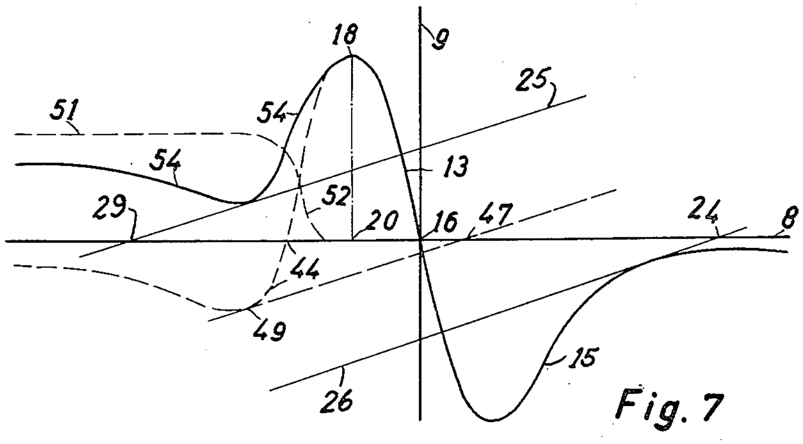

The function of the sync. separator 56 as discriminator will be understood with reference to FIGS. 6 and 7, which correspond to previous FIGS. 2, 3 and 4, as designated by correspondence of reference numerals. Referring first to FIG. 6, it is seen that the composite discriminator characteristic 13 is the same as in FIG. 3 to the right of the origin, but is modified to the left thereof in that the portion 14 is displaced rightwardly and downwardly as indicated by the solid line curve 44. The displacement shifts a substantial part of the curve 44 below the axis of abscissae 8. While the upper limit of the lock-in range is determined by straight line 26 and free operating frequency 24 as previously, its lower limit is now determined by straight line 50 which is just barely not tangent to the curve 44 at its knee 49. Limit line 50 gives rise to a free operating frequency 47 to the right of the origin. Thus the lock-in range is severely restricted and moreover is undesirably limited to the upper frequency portion of the discriminator curve.

The displacement of the composite discriminator characteristic is due to the superimposition on the discriminator curve 14 proper, of the effects due to location of the picture carrier approximately midway down the skirt of the I.F. selectivity curve, and of the automatic gain control. The effects are represented by the dashed line curves 45 and 46 respectively.

Referring to FIG. 7, it is seen that the composite discriminator characteristic 13 is restored approximately to symmetry by adding to the original characteristic 44, a ramp-type discriminator characteristic that includes a portion 52 which rises upward and leftward of the peak frequency 20, and then terminates in a flat portion 51. The resultant composite of the curves 44 and 51—52 is indicated by the solid line curve portion 54 of the discriminator curve 13, which is symmetrical to the corresponding portion 15, and restores limit line 25 and free operating frequency 29 as limits of the lock-in range. Fortuitously, the ramp characteristic 51—52 is available at the sync. separator 56, so that all that is required for generation of the corrective effect, is rectification of the horizontal sync. pulses by means of unit 55 and application to the variable reactance 3.

Figure 8:
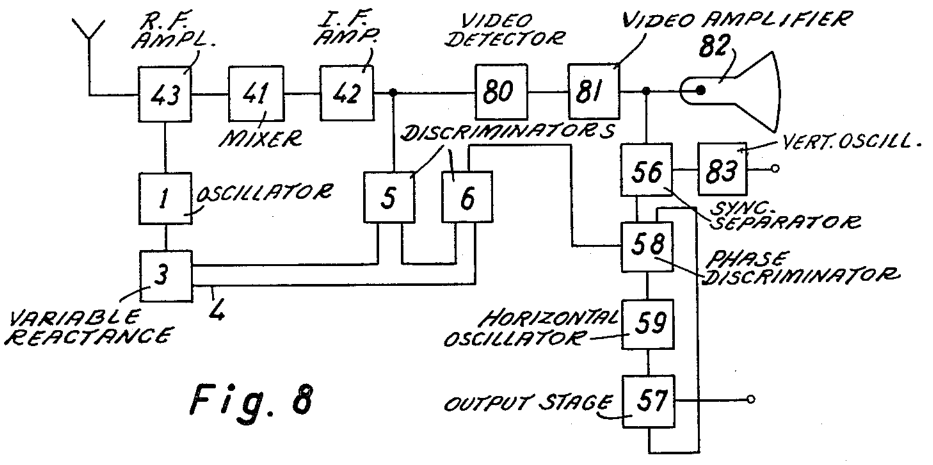
FIG. 8 is a simplified block diagram of a television receiver embodying a further modification of the invention.

An alternative arrangement for generating the corrective function 51—52 is illustrated in FIG. 8 which corresponds generally to FIG. 5 as signified by like reference numerals. In FIG. 8 the sync. separator 56 drives the vertical oscillator 83, and also the horizontal oscillator 59 which in turn drives the line sync. output stage 57. A phase discriminator 58 is provided intermediate of the units 56 and 59; it additionally receives from the stage 57 the final line sync. driver pulses and compares the frequency and phase relation of the pulses derived from the units 56 and 57. A phase discriminator output error voltage which is proportional to the phase error, is applied to unit 59 and shifts the frequency unit phase of the horizontal oscillator 59 and ultimately of the line sync. driver stage 57 so as to cause the phase error to approach zero.

The just described automatic control system for locking in the frequency and phase of the horizontal oscillator per se forms no part of our invention; it is found in many better quality television receivers and will be described in further detail with reference to FIG. 9. However, the voltage developed by the unit 58 satisfies the corrective discriminator characteristic 51—52 (FIG. 7), and in accordance with the invention we apply this error voltage to the units 5 and 6 to correct the automatic tuning control response in the manner described with reference to FIGS. 5 and 7.

Figure 9:
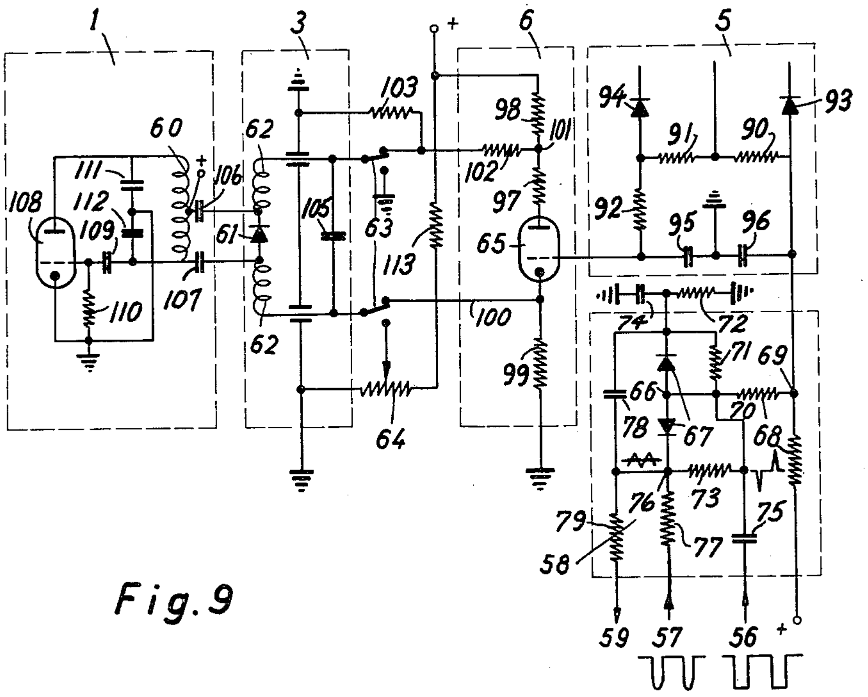
FIG. 9 is a schematic drawing of part of the apparatus of FIG. 8.

Referring to FIG. 9, the phase discriminator 58 is provided with a voltage divider bias network that includes resistors 68, 70, 71 and 72 connected in order from the positive supply voltage to ground. The anodes of two discriminator diodes 67 are connected to the junction 66 of the resistors 70 and 71, the upper diode 67 shunting the resistor 71. The lower diode 67 is shunted by a load resistor 73 similar to resistor 71. A bypass capacitor 74 shunts resistor 72. The separated horizontal sync. pulses are derived from unit 56 and are applied through a differentiating capacitor 75 to the junction 66, where they appear in the indicated differentiated form of alternating negative and positive spikes. The diodes 67 block the negative spikes, while transmitting the positive spikes. The diode cathodes would then derive equal potential contributions from the spikes were it not for the generation of the indicated saw tooth wave at the junction 76 of the lower diode and resistor 73. The saw tooth signal is derived from the unit 57 which supplies the indicated drive pulses to the junction 76 via the resistor 77, which together which capacitor 78 that is connected across the diodes, forms an integrating network.

If the input signals from the units 56 and 57 are in synchonism the positive spike will arrive at the junction 76 as the saw tooth passes through zero. In this case the error potential produced by the lower diode is zero. If the saw tooth wave falls out of step with the spikes, an error potential is developed at the junction 76, whose magnitude increases with increasing asynchronism. This error potential is transmitted to the horizontal oscillator 59 via resistor 79.

The potential available at the junction 66 due to the separated horizontal sync. pulses varies in the manner indicated by the curve 51—52 (FIG. 7), as previously explained. This potential is utilized for correction of the automatic tuning characteristic, by connecting the junction 69 of the resistors 68 and 70 through the diode load resistors 90 and 91 of the discriminator 5 proper and then through a further resistor 92 to the grid of a D.C. amplifier tube 65. The discriminator 5 is of well known construction and is therefore only partly illustrated. It includes the usual diodes 93 and 94, connected to the resistors 90 and 91 respectively. Serially connected bypassed capacitors 95 and 96 shunt the resistors 90, 91, and 92; the junction of the capacitors is grounded. The junction of the resistors 90 and 91 is brought out to the center tap of the usual discriminator secondary winding (not shown). It is readily seen that the discriminator error voltages appear in added form at the grid of tube 65.

The anode of tube 65 is connected through series connected resistors 97 and 98, provided for voltage division to the supply voltage, whereas the cathode is connected through resistor 99 to ground. Both the cathode and the anode circuits provide inputs to the variable reactance means 3. The cathode input is direct via line 100 and the lower section of a double-pole double-throw switch 63, in its indicated upper position. The anode circuit input is derived from the junction 101 of resistors 97 and 98. A further voltage divider comprising resistors 102 and 103 connects junction 101 to ground. The input to unit 3 is tapped off from the junction of resistors 102 and 103 and is applied through the upper section of switch 63.

The variable reactance unit 3 includes a capacitor 105 that is connected across the switches 63 and is shunted by two inductances 62, intermediate of which there is connected a diode 61. The diode 61 functions to represent a variable reactance to the tuned circuit of the oscillator unit 1 in response to the error signals derived from the two discriminators.

The cathode and anode of the diode 61 are connected through capacitors 106 and 107 to a tap and to the lower end of tank coil 60 of the local oscillator 1. Plate supply voltage is introduced at the coil tap. The upper end of the coil is connected to the plate of the oscillator tube 108, while its lower end connects to the grid thereof through blocking capacitor 109. A grid leak resistor 110 is connected between the grid and ground, while the cathode is grounded. Series connected capacitors 111 and 112, whose junction is grounded, are connected in parallel with the tank coil 60 and principally determine the local oscillator frequency, subject to the fine control exercized by the variable reactance unit 3.

For purposes of manual rather than automatic fine control of the local oscillator, the switch 63 is placed in its alternate lower position. This grounds the upper end of capacitor 105 and connects its lower end to the slider of a manually operable potentiometer 64 whose left end is grounded and whose right end connects through a resistor 113 to the supply voltage. Displacement of the slider varies the voltage applied to the variable reactance unit 3 and ultimately the local oscillator frequency.

From the preceding description it is seen that we have provided in accordance with the present invention automatic frequency control systems, which although simple and economical in construction are highly effective in extending the lock in ranges of the oscillators they control. While several embodiments of the invention have been described, it will be appreciated that many further modifications may occur to those skilled in the art, and it is intended that all such modifications be comprehended as within the invention as defined in the appended claims. For example, the invention is readily applicable to a split sound type television receiver. Here the principal error voltage may be derived directly from the sound discriminator, and the auxiliary discriminator may be associated with either the sound channel or may if desired, be driven by the separated picture carrier.

Obviously the invention may also be applied to a frequency modulation receiver. Here again the sound discriminator may furnish the principal error voltage, and the auxiliary discriminator may be associated with the principal discriminator. The invention can be applied advantageously to an amplitude modulation receiver in similar manner. Further, the invention may be readily applied to existing A.F.C. systems to improve their performance.

What is claimed is:

1. In a television receiver of the intercarrier type; means providing transmitted amplitude-modulated radio frequency carrier audio and video signals; a local oscillator tunable to a desired frequency having a predetermined relation to said carriers but apt to deviate therefrom; a mixer responsive to said carriers and local oscillator producing intermediate frequency sound and picture carriers; a frequency discriminator responsive to said intermediate frequency picture carrier to produce an error signal voltage representative of the deviation of the local oscillator frequency from said desired frequency; a video channel including a video detector and a thereto connected video amplifier for demodulating said intermediate frequency carriers; synchronization pulse separating means for extracting horizontal and vertical synchronization pulses from the demodulated video signal; means for rectifying said horizontal synchronization pulses and providing a second error signal voltage; means for summing up the error signal voltages produced by said first and second discriminators, respectively, and for producing thus a combined error signal voltage and a signal-dependent variable reactance included in the frequency determining network of said oscillator responsive to said combined error signal voltage for causing the local oscillator frequency to approach said desired frequency and said error signals to approach zero.

2. An automatic frequency control system comprising oscillator means intended to operate at a desired frequency but apt to furnish an output frequency deviating therefrom; a first and a second discriminator each tuned to a predetermined frequency having a predetermined relation to said desired frequency and each producing an error signal voltage representative of the deviation of said output frequency from said desired frequency, said first discriminator having an unsymmetrical voltage/frequency characteristic displaying a positive and negative voltage maximum related to first and second frequencies, respectively, located predetermined amounts above and below said predetermined frequency, the difference between said first and second frequencies being the hold-in range of said oscillator means, said characteristic further having two operating points determined by the unsymmetrical form of said characteristic in the frequency ranges outside said hold-in range and located at third and fourth frequencies, respectively, unsymmetric with respect to said predetermined frequency but within said hold-in range, the difference between said third and fourth frequencies being the lock-in range of said oscillator means, and said second discriminator having a voltage/frequency characteristic adapted to supplement said characteristic of said first discriminator so as to produce a combined voltage/frequency characteristic more symmetrical than said characteristic of said first discriminator and in which said hold-in range is increased so as to locate said third and fourth frequencies substantially symmetrically with respect to said predetermined frequency and said lock-in range is extended substantially to the amount of said increased hold-in range; means for summing up the error signal voltages produced by said first and second discriminator, respectively, according to their respective voltage/frequency characteristics and for thus producing said combined voltage/frequency characteristic; and a signal-dependent variable reactance means included in the frequency determining network of said oscillator means responsive to said combined error signal voltage for causing the generated output frequency to approach said desired frequency and said error signals to approach zero.

3. In a television receiver for receiving signals amplitude modulated according to the single-sideband method, means providing transmitted and received audio and video signals applied by amplitude modulation to a radio frequency carrier; local oscillator means tunable to a desired frequency having a predetermined relation to said carrier frequency but apt to deviate therefrom; mixer means responsive to said carrier frequency and to the output of said local oscillator for producing intermediate frequency sound and picture carriers; frequency discriminator means responsive to said intermediate frequency picture carrier for producing a first error signal voltage representative of the deviation of the local oscillator frequency from said desired frequency; video channel means including video detector means and video amplifier means connected thereto for demodulating said intermediate frequency carriers; synchronization pulse separating means for extracting horizontal and vertical synchronization pulses from the demodulated video signal; vertical oscillator means responsive to said vertical synchronization pulses; horizontal oscillator means responsive to said horizontal synchronization pulses and a horizontal synchronization output stage driven by said horizontal oscillator means; phase discriminator means interconnected with said synchronization pulse separating means, said horizontal oscillator means and said horizontal synchronization output stage for comparing the frequency and phase of the horizontal synchronization pulses furnished by said synchronization separating means with the frequency and phase of the pulses furnished by said synchronization output stage, and including rectifier means for rectifying said horizontal synchronization pulses and providing a second error signal voltage; voltage summing means for summing up said first and second error signal voltages produced by said frequency and phase discriminator means, respectively, and for producing thus a combined error signal voltage; and signal-dependent variable reactance means included in the frequency-determining network of said local oscillator means and responsive to said combined error signal voltage for causing the local oscillator frequency to approach said desired frequency and said error signals to approach zero.

4. A television receiver as claimed in claim 3, wherein said phase discriminator means comprise a voltage divider bias network connected between a source of positive supply voltage and ground and including a first, second, third and fourth resistor in series-connection with a first, second and third junction point respectively therebetween, first input means for said horizontal synchronization pulses from said synchronization pulse separating means and including discriminating capacitor means, second input means for drive pulses from said synchronization output stage and including input resistor means, rectifier means including a first and a second rectifier connected in back-to-back arrangement with each other with a junction point therebetween connected both with said discriminating capacitor means and with said second junction point of said voltage divider network, said third resistor thereof being connected in parallel with said first rectifier, and a load resistor being connected in parallel with said second rectifier, said rectifiers being polarized to pass only positive voltage appearing at said junction point therebetween, capacitor means connected in parallel with said rectifier means and in series with said second input means to form an integrating network together with said input resistor means, a junction point between said last mentioned capacitor means and said input resistor means constituting an output for a potential to be supplied to said synchronization output stage, said first junction point of said voltage divider network constituting an output for said second error signal voltage derived from the rectified voltage appearing at said junction point between said first and second rectifiers and supplied to said voltage summing means.

References Cited in the file of this patent

UNITED STATES PATENTS

| | | |
|---|---|---|
| 2,552,140 | Boothroyd | May 8, 1951 |
| 2,677,049 | Rogers | Apr. 27, 1954 |
| 2,714,132 | Fredendall | July 26, 1955 |
| 2,916,545 | Baugh | Dec. 8, 1959 |

FOREIGN PATENTS

| | | |
|---|---|---|
| 479,458 | Canada | Dec. 18, 1951 |